Figure 1A:
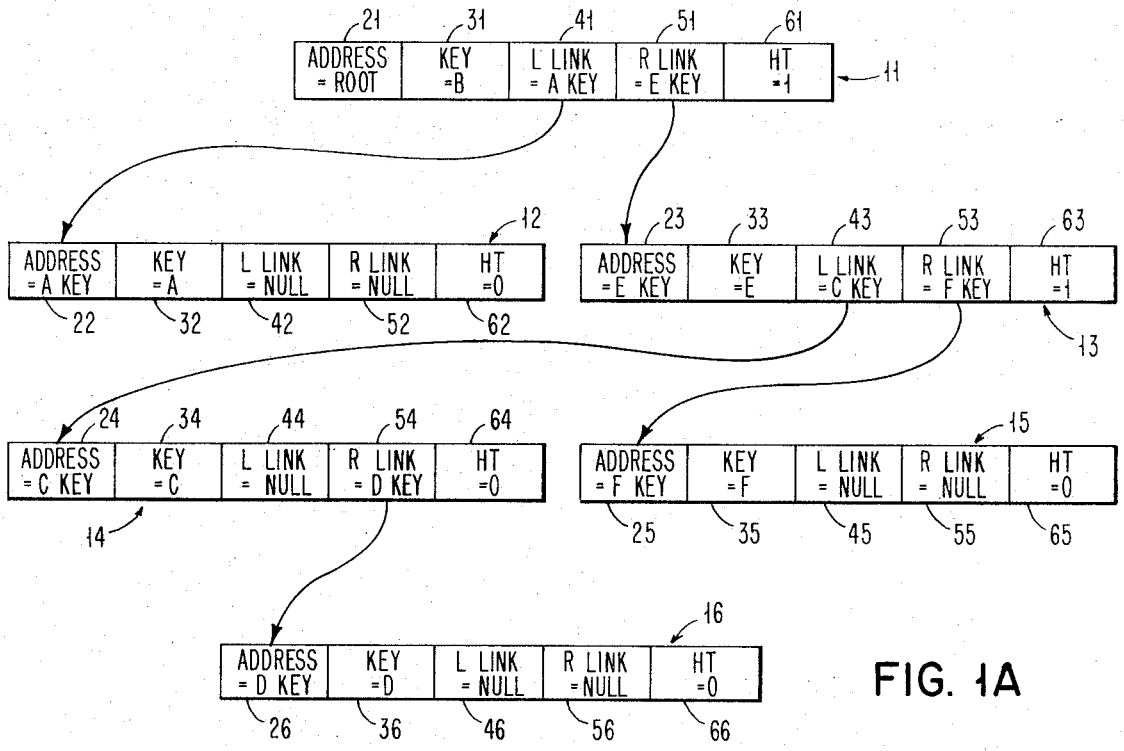
Figure 1B:
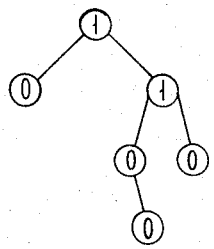
Figure 2A:
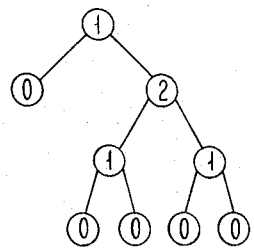
Figure 2B:
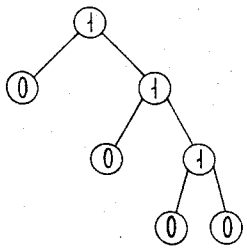
Figure 3A:
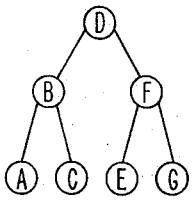
Figure 3B:
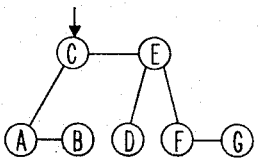
Figure 3C:
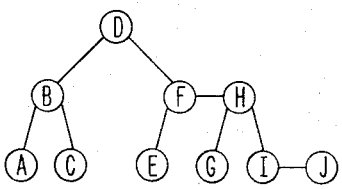
Figure 4:
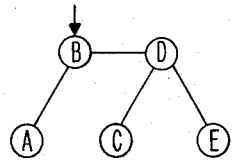
Figure 5:
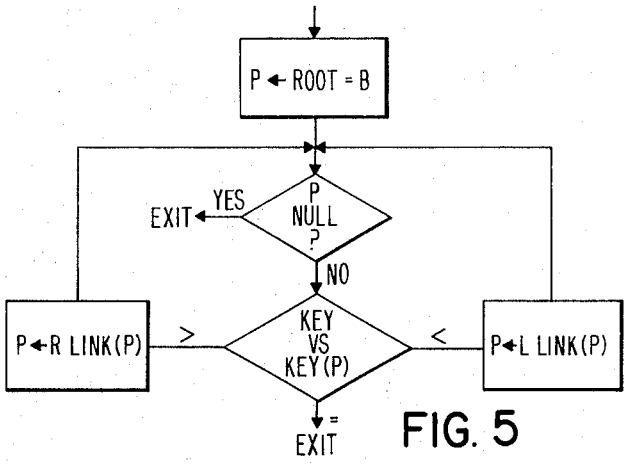
Figure 6:
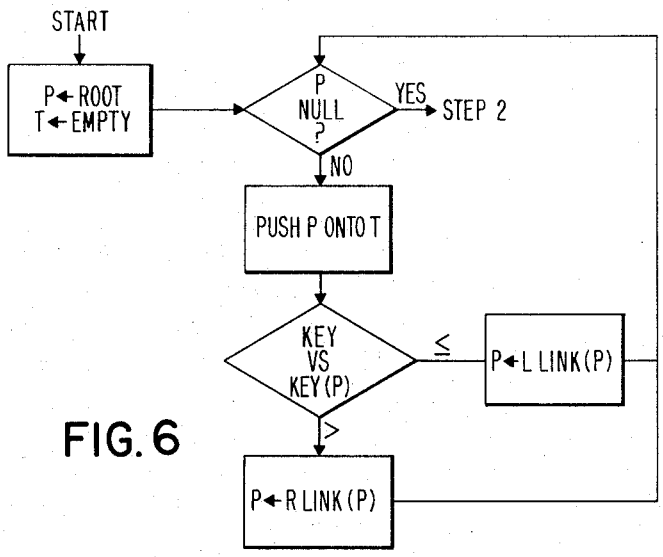
Figure 7:
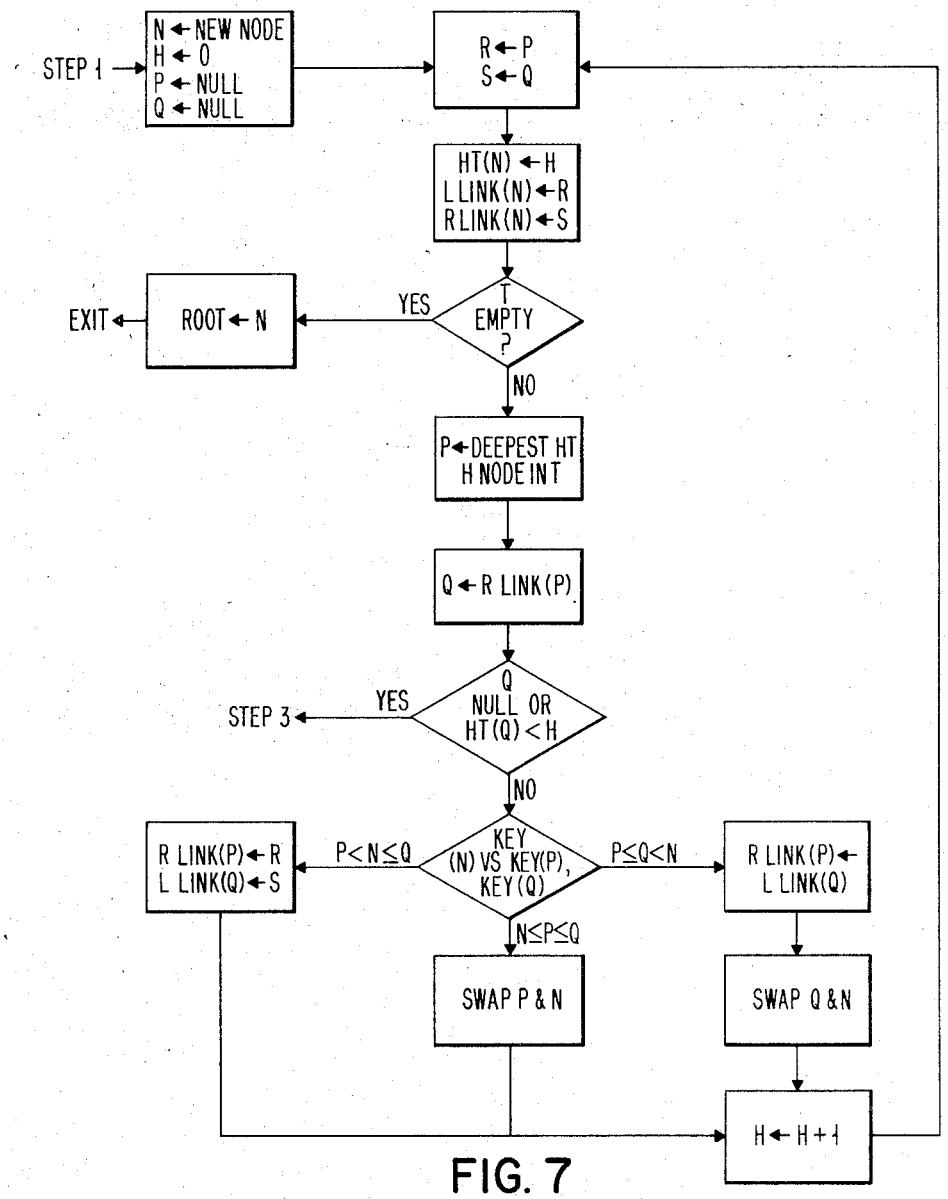
Figure 9:
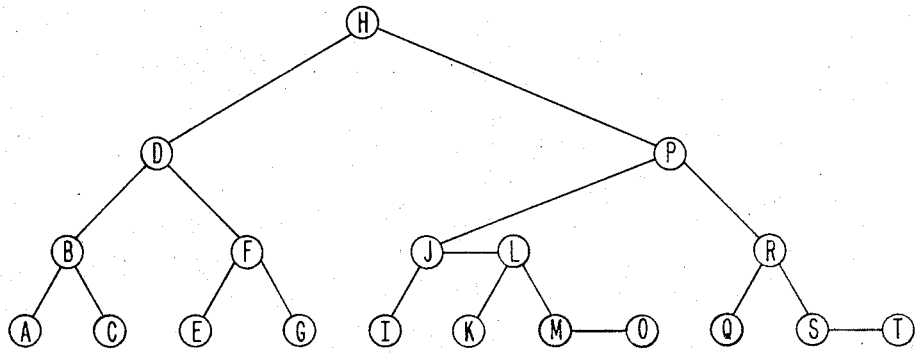
Figure 8:
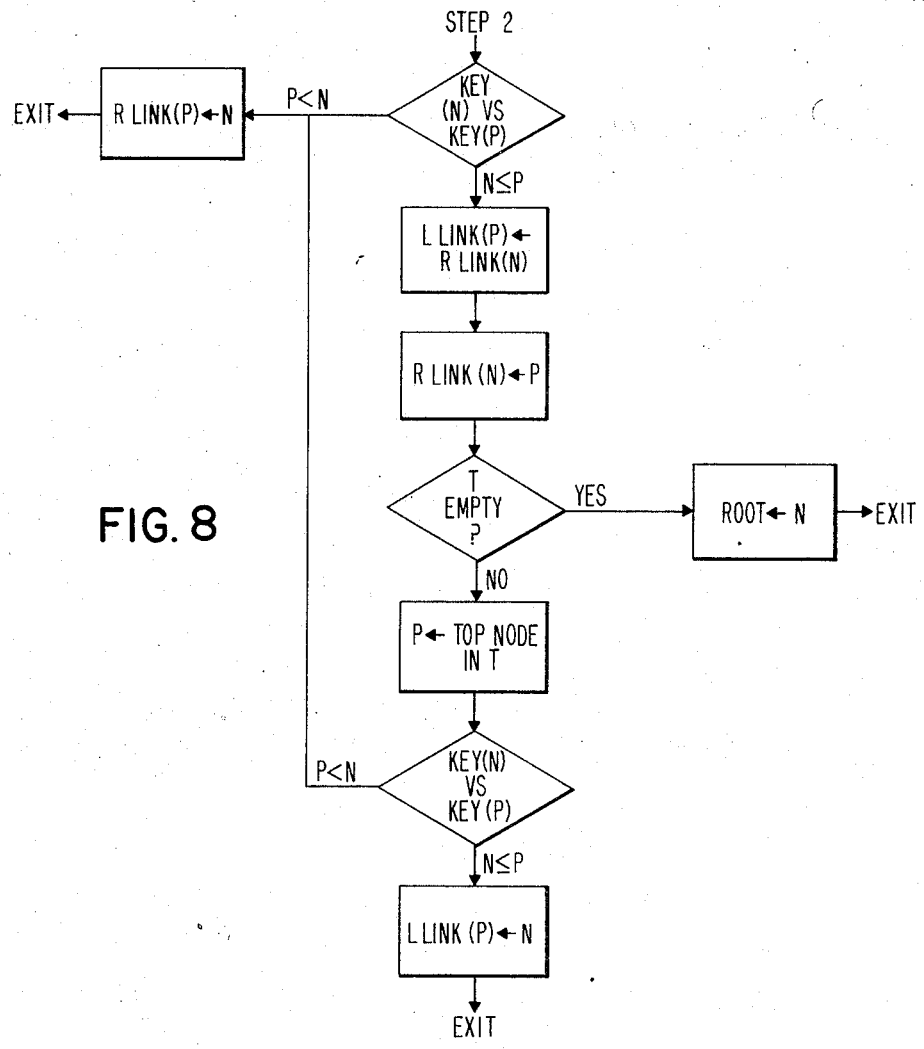
Figure 10:
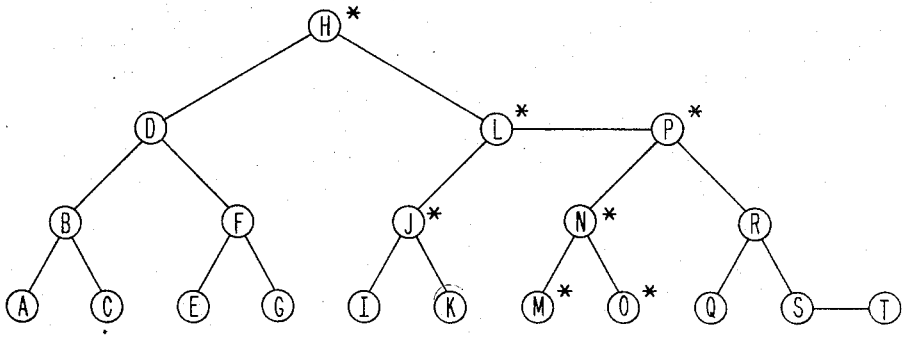
Figure 11A:
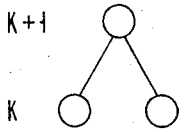
Figure 11B:
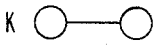

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916 O.G. 1211

T916,004
DATA TREE STRUCTURE AND MAINTENANCE METHOD

Watson M. Conner II, Los Gatos, Calif., assignor to International Business Machines Corporation, Armonk, N.Y.

Continuation of application Ser. No. 212,349, Dec. 27, 1971. This application Jan. 16, 1973, Ser. No. 324,036
Int. Cl. G06f *9/00*
U.S. Cl. 444—1
4 Sheets Drawing. 15 Pages Specification

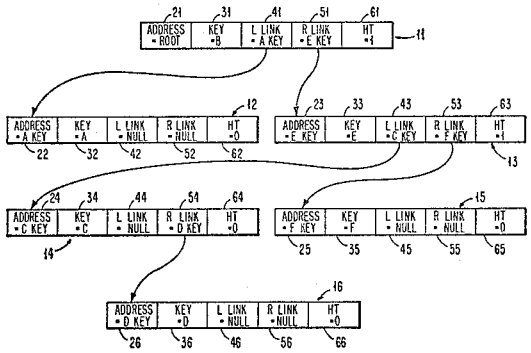

A 2 log binary tree data set structure where the null height of the nodes in any path is non-increasing, and where in any path there are not more than two nodes at the same null height. Also, the method for adding to and deleting nodes from a 2 log binary tree so that the resulting structure is also a 2 log tree.

DATA TREE STRUCTURE AND MAINTENANCE METHOD

Original Filed Dec. 27, 1971 4 Sheets-Sheet 1

DATA TREE STRUCTURE AND MAINTENANCE METHOD

Original Filed Dec. 27, 1971 4 Sheets-Sheet 3

DATA TREE STRUCTURE AND MAINTENANCE METHOD

Original Filed Dec. 27, 1971 4 Sheets-Sheet 4